United States Patent
Xu et al.

(10) Patent No.: US 10,484,269 B2
(45) Date of Patent: Nov. 19, 2019

(54) BACKUP DESIGNATED ROUTER (BDR) ELECTION AND DESIGNATED ROUTER (DR) FAILURE PROCESSING METHODS AND EQUIPMENT

(71) Applicant: ZTE Corporation, Shenzhen (CN)

(72) Inventors: Benchong Xu, Shenzhen (CN); Zheng Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/742,617

(22) PCT Filed: Apr. 5, 2016

(86) PCT No.: PCT/CN2016/078488
§ 371 (c)(1),
(2) Date: Jan. 8, 2018

(87) PCT Pub. No.: WO2016/177241
PCT Pub. Date: Nov. 10, 2016

(65) Prior Publication Data
US 2018/0205638 A1    Jul. 19, 2018

(30) Foreign Application Priority Data

Jul. 7, 2015   (CN) .......................... 2015 1 0395069

(51) Int. Cl.
*H04L 12/703*    (2013.01)
*H04L 12/751*    (2013.01)
(Continued)

(52) U.S. Cl.
CPC .......... *H04L 45/28* (2013.01); *H04L 12/1863* (2013.01); *H04L 45/02* (2013.01);
(Continued)

(58) Field of Classification Search
CPC ..... H04L 45/28; H04L 12/1863; H04L 45/22; H04L 45/16; H04L 45/02; H04L 12/185; H04L 47/825
See application file for complete search history.

(56) References Cited

U.S. PATENT DOCUMENTS

2006/0092859 A1\* 5/2006 Choi ................. H04L 29/12018
370/254
2006/0221962 A1\* 10/2006 Previdi ............... H04L 12/1836
370/390
(Continued)

FOREIGN PATENT DOCUMENTS

CN          1874315 A     12/2006
CN      101247252 A      8/2008
(Continued)

OTHER PUBLICATIONS

International Search Report for corresponding application PCT/CN2016/078488 filed on Apr. 5, 2016; dated Jun. 24, 2016.
(Continued)

*Primary Examiner* — Jung Liu
(74) *Attorney, Agent, or Firm* — Cantor Colburn LLP (57) ABSTRACT

Backup Designated Router (BDR) election and Designated Router (DR) failure processing methods and equipment are provided. When a user joins, a BDR in a subnetwork completes a preparation for forwarding multicast traffic for the user, but does not forward the multicast traffic through an interface; and when detecting that a DR in the subnetwork fails, the BDR is switched to be a DR in the subnetwork, and forwards the multicast traffic for the user through the interface.

19 Claims, 2 Drawing Sheets

(51) Int. Cl.
     *H04L 12/761*   (2013.01)
     *H04L 12/18*    (2006.01)
     *H04L 12/707*   (2013.01)

(52) U.S. Cl.
     CPC .............. *H04L 45/16* (2013.01); *H04L 45/22*
                        (2013.01); *H04L 12/185* (2013.01)

(56) References Cited

U.S. PATENT DOCUMENTS

| | | | | |
|---|---|---|---|---|
| 2008/0205395 | A1* | 8/2008 | Boddapati | H04L 12/1868 |
| | | | | 370/390 |
| 2008/0240118 | A1* | 10/2008 | Roy | H04L 45/02 |
| | | | | 370/400 |
| 2009/0161670 | A1* | 6/2009 | Shepherd | H04L 12/185 |
| | | | | 370/389 |
| 2011/0267962 | A1* | 11/2011 | J S A | H04L 41/147 |
| | | | | 370/242 |
| 2012/0294308 | A1* | 11/2012 | Cai | H04L 45/38 |
| | | | | 370/390 |
| 2012/0327775 | A1* | 12/2012 | Han | H04L 47/15 |
| | | | | 370/236 |
| 2016/0043878 | A1* | 2/2016 | Hao | H04L 45/16 |
| | | | | 370/390 |
| 2017/0005816 | A1* | 1/2017 | Chang | H04L 12/1863 |
| 2017/0126587 | A1* | 5/2017 | Ranns | H04L 47/825 |

FOREIGN PATENT DOCUMENTS

| | | |
|---|---|---|
| CN | 102255797 A | 11/2011 |
| CN | 102377584 A | 3/2012 |
| CN | 103117935 A | 5/2013 |
| CN | 102255797 B | 9/2014 |
| EP | 1816800 A1 | 8/2007 |

OTHER PUBLICATIONS

European Search Report for corresponding application EP16789235; dated Jul. 10, 2018.
Fenner AT&T Labs-Research, "Protocol Independent Multicast-Sparse Mode (PIM-SM): Protocol Specification", Aug. 1, 2006, XP015047366.

* cited by examiner

BACKUP DESIGNATED ROUTER (BDR) ELECTION AND DESIGNATED ROUTER (DR) FAILURE PROCESSING METHODS AND EQUIPMENT

TECHNICAL FIELD

The present disclosure relates to, but is not limited to, a network technology, and particularly to a Protocol Independent Multicast (PIM)-protocol-based Backup Designated Router (BDR) election method, a Designated Router (DR) failure processing method and corresponding equipment.

BACKGROUND

In a subnetwork of a shared network, for example, the Ethernet, PIM equipment (which may also be called a PIM router) may elect a DR based on a PIM protocol. Specifically, the PIM equipment may determine itself as a DR by default after an interface is UP (a state specified in the protocol), and may perform DR reelection to select a new DR after receiving a Hello message (a message specified in the protocol). A message sent when an Internet Group Management Protocol (IGMP) or Multicast Listener Discover (MLD) user joins or leaves a group may be received by all equipment in the network, and a DR is responsible for forwarding multicast traffic to users in the subnetwork.

When an elected DR in a subnetwork fails, another DR in the subnetwork may need to be elected to forward traffic to a network. This process may generate the following delays: a time T1 for detecting a failure of the DR; a time T2 for sending PIM joining to an upstream Rendezvous Point (RP) or DR equipment directly connected to the source; and a time T3 for pushing traffic to new DR equipment. When not considering the condition of time for transferring equipment routing to a forwarding plane, packets of a user may be lost within a delay of T1+T2+T3. In a complex networking or capacity environment, this delay becomes more detectable.

SUMMARY

The below is a summary about subject matter described in the present disclosure in detail. The summary is not intended to limit the scope of protection of the claims.

An embodiment of the present disclosure provides a BDR election method, which may include the following acts.

PIM equipment may elect a BDR in a subnetwork.

The PIM equipment may store information of the elected BDR in the subnetwork.

In an exemplary embodiment, before the PIM equipment elects the BDR in the subnetwork, the method may further include the following acts. The PIM equipment may determine, in an election waiting state, whether a Hello message carrying information of a BDR is received or not.

In a case where the Hello message carrying the information of the BDR is not received, the operation that the PIM equipment elects the BDR in the subnetwork may include the following acts. The PIM equipment may elect the BDR in the subnetwork according to a predetermined rule.

In an exemplary embodiment, the operation that the PIM equipment elects the BDR in the subnetwork according to the predetermined rule may include the following acts. The PIM equipment may elect optimal PIM equipment among all PIM equipment, except a DR, in the subnetwork as the BDR in the subnetwork.

In an exemplary embodiment, all of Hello messages received by an interface of the PIM equipment and Hello messages sent by an interface of the PIM equipment may carry a DR priority option. The optimal PIM equipment may refer to one piece of PIM equipment with a highest priority or one piece of PIM equipment with a largest or smallest Internet Protocol (IP) address in multiple pieces of PIM equipment with a highest priority.

Alternatively, in an exemplary embodiment, at least one of Hello messages received by an interface of the PIM equipment and Hello messages sent by an interface of the PIM equipment may not carry a DR priority option. The optimal PIM equipment may refer to one piece of PIM equipment with a largest or smallest IP address.

In an exemplary embodiment, in a case where the PIM equipment receives, in an election waiting state, a Hello message through an interface and the Hello message carries information of a BDR, the operation that the PIM equipment elects the BDR in the subnetwork may include the following acts.

The PIM equipment may determine the BDR carried in the received Hello message as the BDR elected by the PIM equipment.

In an exemplary embodiment, after the interface of the PIM equipment is UP in the subnetwork, the PIM equipment may enter the election waiting state and start an election waiting timer.

In a case where the PIM equipment receives, in the election waiting state, a Hello message through the interface and the Hello message carries information of a BDR, the PIM equipment may enter an election state, stop the election waiting timer and determine the BDR carried in the Hello message as the BDR elected by the PIM equipment.

In an exemplary embodiment, the method may further include the following acts.

After timeout of the election waiting timer, the PIM equipment may enter the election state, and elect the BDR in the subnetwork according to a predetermined rule.

In an exemplary embodiment, a timing duration of the election waiting timer may be longer than or equal to a default keep-alive time of a neighbor.

In an exemplary embodiment, the information of the BDR may include a legal unicast address of the BDR. That the received Hello message carries the information of the BDR may include: the received Hello message may include a BDR address option and a value of the BDR address option is the legal unicast address.

In an exemplary embodiment, the method may further include the following acts.

In a case where the PIM equipment has not yet elected the BDR in the election waiting state, a Hello message carrying a BDR address option may be sent through the interface, a value of the BDR address option being a predetermined invalid value.

In an exemplary embodiment, after the PIM equipment enters an election state, the method may further include the following acts.

In a case where the PIM equipment receives a Hello message carrying a BDR address option through the interface and a value of the BDR address option is a predetermined invalid value, a Hello message carrying a BDR address option may be sent through the interface, a value of the BDR address option being a stored legal unicast address of the BDR in the subnetwork.

In an exemplary embodiment, the method may further include the following acts.

After the PIM equipment detects that the BDR in the subnetwork fails, in a case where the stored information of the BDR in the subnetwork is information of the failing BDR, the BDR in the subnetwork may be reelected, and the stored information of the BDR in the subnetwork may be updated.

In an exemplary embodiment, the method may further include the following acts.

After the PIM equipment enters an election state, when the PIM equipment receives a Hello message through an interface and information of a BDR carried in the Hello message is different from the stored information of the BDR in the subnetwork, the following acts may be executed.

In a case where the PIM equipment is not the BDR in the subnetwork, the BDR carried in the Hello message may be determined as a reelected BDR in the subnetwork, and the stored information of the BDR in the subnetwork may be updated.

In a case where the PIM equipment is the BDR in the subnetwork, the BDR in the subnetwork may be reelected according to a predetermined rule, and the stored information of the BDR in the subnetwork may be updated.

In an exemplary embodiment, the method may further include the following acts.

When a DR in the subnetwork is normal, the BDR in the subnetwork may complete a preparation for forwarding multicast traffic for a user but not forward the multicast traffic through the interface; and when the DR in the subnetwork fails, the BDR in the subnetwork may forward the multicast traffic for the user, and may be switched to be a DR in the subnetwork.

In an exemplary embodiment, the method may further include the following acts.

After the PIM equipment stores the information of the BDR in the subnetwork or updates the stored information of the BDR in the subnetwork, a Hello message may be sent through an interface, the Hello message carrying the stored information of the BDR in the subnetwork.

In an exemplary embodiment, the operation that the PIM equipment elects the BDR in the subnetwork according to the predetermined rule may include the following acts.

After the PIM equipment enters an election state, when PIM equipment, except the BDR, in the subnetwork detects that a DR in the subnetwork fails, the elected BDR in the subnetwork may be elected to be a DR in the subnetwork, and the BDR in the subnetwork may be reelected according to a predetermined rule.

In an exemplary embodiment, the operation that the PIM equipment elects the BDR in the subnetwork according to the predetermined rule may include the following acts.

When the PIM equipment does not support carrying a BDR address option in the Hello message and/or at least one Hello message received through an interface does not include the BDR address option, the DR in the subnetwork may be elected, and at the same time, the BDR in the subnetwork may be elected according to a predetermined rule.

Another embodiment of the present disclosure provides a computer-readable storage medium, which may store a computer-executable instruction, the computer-executable instruction being configured to execute any abovementioned method.

Correspondingly, still another embodiment of the present disclosure provides PIM equipment, which may include an election module and a storage module.

The election module may be configured to elect a BDR in a subnetwork.

The storage module may be configured to store information of the BDR in the subnetwork.

In an exemplary embodiment, the election module may be configured to:

determine, in an election waiting state, whether a Hello message carrying information of a BDR is received or not; and in a case where the Hello message carrying the information of the BDR is not received, elect the BDR in the subnetwork according to a predetermined rule.

In an exemplary embodiment, the election module may be configured to elect the BDR in the subnetwork according to the predetermined rule in a following manner: optimal PIM equipment among all PIM equipment, except a DR, in the subnetwork may be elected as the BDR in the subnetwork.

In an exemplary embodiment, the PIM equipment may further include an interface module.

The interface module may be configured to receive Hello messages and send Hello messages.

All of Hello messages received by the interface module and Hello messages sent by the interface module may carry a DR priority option. The election module may be configured to elect the following PIM equipment as the BDR in the subnetwork: one piece of PIM equipment with a highest priority or one piece of PIM equipment with a largest or smallest IP address in multiple pieces of PIM equipment with a highest priority.

Alternatively, at least one of Hello messages received by the interface module and Hello messages sent by the interface module does not carry a DR priority option. The election module may be configured to elect the following PIM equipment as the BDR in the subnetwork: one piece of optimal PIM equipment with a largest or smallest IP address.

In an exemplary embodiment, the election module may further be configured to:

in a case where the interface module receives, in an election waiting state, a Hello message and the Hello message carries information of a BDR, determine the BDR carried in the received Hello message as the BDR elected by the election module.

In an exemplary embodiment, the election module may be configured to:

after the interface module is UP in the subnetwork, enter the election waiting state, and start an election waiting timer.

in a case where the interface module receives, in an election waiting state, a Hello message and the Hello message carries information of a BDR, enter an election state, stop the election waiting timer and determine the BDR carried in the Hello message as the BDR elected by the election module.

In an exemplary embodiment, the election module may be configured to elect the BDR in the subnetwork according to the predetermined rule in a following manner:

in a case where the Hello message carrying the information of the BDR is not received in the election waiting state, the BDR in the subnetwork may be elected according to a predetermined rule.

In an exemplary embodiment, the information of the BDR may include a legal unicast address of the BDR.

The election module may be configured to judge that the Hello message received by the interface module carries the information of the BDR in a following manner: the received Hello message may include a BDR address option and a value of the BDR address option is the legal unicast address.

In an exemplary embodiment, the interface module may be configured to implement sending of the Hello message in a following manner: in a case where the BDR has not yet been elected in the election waiting state, a Hello message carrying a BDR address option may be sent, a value of the BDR address option being a predetermined invalid value.

In an exemplary embodiment, the interface module may further be configured to: after entering an election state, in a case where a Hello message carrying a BDR address option is received and a value of the BDR address option is a predetermined invalid value, send a Hello message carrying a BDR address option through the interface, a value of the BDR address option being the stored legal unicast address of the BDR in the subnetwork.

In an exemplary embodiment, the PIM equipment may further include: a detection module. The detection module may be configured to detect a failure of the BDR in the subnetwork.

The election module may further be configured to: after entering an election state, in a case where the detection module detects that the BDR in the subnetwork fails and the stored information of the BDR in the subnetwork is information of the failing BDR, reelect the BDR in the subnetwork, and notify the storage module to update the stored information of the BDR in the subnetwork.

In an exemplary embodiment, the election module may further be configured to: after entering an election state, in a case where the interface module receives a Hello message and information of a BDR carried in the Hello message is different from the stored information of the BDR in the subnetwork, when the PIM equipment is not the BDR in the subnetwork, determine the BDR carried in the Hello message as a reelected BDR in the subnetwork, and update the information, stored by the storage module, of the BDR in the subnetwork; and when the PIM equipment is the BDR in the subnetwork, reelect the BDR in the subnetwork according to a predetermined rule, and update the information, stored by the storage module, of the BDR in the subnetwork.

In an exemplary embodiment, the BDR in the subnetwork may be configured to, when a DR in the subnetwork is normal, complete a preparation for forwarding multicast traffic for a user but not forward the multicast traffic through an interface; and when the DR in the subnetwork fails, forward the multicast traffic for the user, and be switched to be a DR in the subnetwork.

In an exemplary embodiment, the interface module may further be configured to: after the information of the BDR in the subnetwork is stored or the stored information of the BDR in the subnetwork is updated, send a Hello message, the Hello message carrying the information, stored by the storage module, of the BDR in the subnetwork.

In an exemplary embodiment, the election module may further be configured to: when detecting that a DR in the subnetwork fails and the local PIM equipment is not the BDR in the subnetwork, elect the elected BDR in the subnetwork to be a DR in the subnetwork, and reelect the BDR in the subnetwork according to a predetermined rule.

In an exemplary embodiment, the election module may be configured to elect the BDR in the subnetwork according to the predetermined rule in a following manner. When the interface module does not support carrying a BDR address option in the Hello message and/or at least one Hello message received by the interface module does not include the BDR address option, the election module may elect the DR in the subnetwork, and at the same time, may elect the BDR in the subnetwork according to a predetermined rule.

In an exemplary embodiment, the election module may further be configured to:

after timeout of the election waiting timer, enter the election state, and elect the BDR in the subnetwork according to a predetermined rule.

In an exemplary embodiment, a timing duration of the election waiting timer may be longer than or equal to a default keep-alive time of a neighbor.

According to the solutions, the BDR in the subnetwork may be elected, so that rapid recovery of multicast traffic forwarding for the user when the DR in the subnetwork fails is implemented. Moreover, the information of the BDR may further be carried in the Hello message, so that switching of BDR equipment when new PIM equipment joins may be avoided, which is favorable for performance of the network.

Still another embodiment of the present disclosure provides a DR failure processing method, which may include the following acts.

When a user joins, a BDR in a subnetwork may complete a preparation for forwarding multicast traffic for the user but not forward the multicast traffic through an interface.

When detecting that a DR in the subnetwork fails, the BDR may be automatically switched to be a DR in the subnetwork, and may forward the multicast traffic for the user through the interface.

In an exemplary embodiment, the BDR in the subnetwork may be elected or reelected according to the method for electing a BDR in a subnetwork.

In an exemplary embodiment, the operation that the BDR completes the preparation for forwarding the multicast traffic for the user may include the following acts. The multicast traffic may be introduced, and a forwarding route to the user may be established.

Another embodiment of the present disclosure provides a computer-readable storage medium, which may store a computer-executable instruction, the computer-executable instruction being configured to execute any abovementioned method.

Still another embodiment of the present disclosure provides a BDR, which may include a preparation module and a switching module.

The preparation module may be configured to, when a user joins a subnetwork, complete a preparation for forwarding multicast traffic for a user but not forward the multicast traffic through an interface.

The switching module may be configured to, when detecting that a DR in the subnetwork fails, switch the BDR to be a DR in the subnetwork, and forward the multicast traffic for the user through the interface.

In an exemplary embodiment, the BDR in the subnetwork may be elected or reelected according to the method for electing a BDR in a subnetwork.

In an exemplary embodiment, the preparation module may be configured to complete the preparation for forwarding the multicast traffic for the user in a following manner. The multicast traffic may be introduced, and a forwarding route to the user may be established.

In the previous solution, the BDR is preselected, the multicast traffic of the user is introduced to the BDR, and the BDR forwards the traffic for the user in the subnetwork immediately when detecting the failure of the DR. Compared with related technologies, network packet loss caused by the failure of the DR may be greatly reduced, and a standard may be beneficially complemented.

After the drawings and detailed descriptions are read and understood, the other aspects may be comprehended.

DETAILED DESCRIPTION OF THE EMBODIMENTS

Methods of the present disclosure will be elaborated below. Meanwhile, the present disclosure will be described in combination with the drawings in detail. Parts, which are not specially described may be consistent with protocol behaviors specified by a standard RFC4601.

First Embodiment

In order to implement rapid recovery of forwarding of multicast traffic to a user in case of a failure of a DR, according to the embodiment, a BDR may be preselected, the multicast traffic may be introduced into the BDR, and the BDR may forward the traffic to the user in a subnetwork immediately when detecting the failure of the DR, so that network packet loss caused by the failure of the DR may be reduced.

Figure 1:
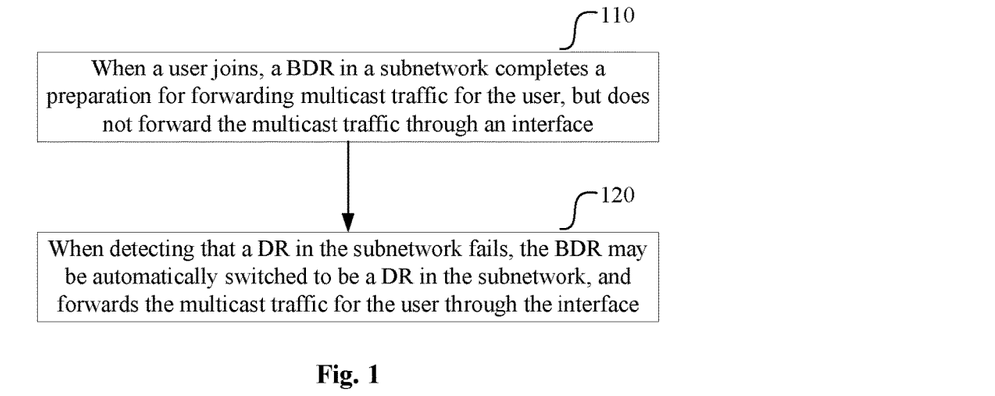
FIG. 1 is a flowchart of a DR failure processing method according to a first embodiment of the present disclosure.

As shown in FIG. 1, a DR failure processing method of the embodiment may include acts S110 and S120.

At act 110, when a user joins, a BDR in a subnetwork may complete a preparation for forwarding multicast traffic for the user but not forward the multicast traffic through an interface.

The operation that BDR completes the preparation for forwarding the multicast traffic for the user may include the following acts. The multicast traffic may be introduced, and a forwarding route to the user may be established. Specifically, when the user joins (Local Membership), the BDR may complete the preparation for forwarding the multicast traffic for the user according to a DR behavior specified by a protocol (specified by, for example, an RFC4601). The BDR may introduce the multicast traffic, establish the forwarding route to the user in a routing table but not forward the multicast traffic at the interface, and may forward the multicast traffic immediately when a failure of a DR is detected.

At act 120, when detecting that a DR in the subnetwork fails, the BDR may be automatically switched to be a DR in the subnetwork, and may forward the multicast traffic for the user through the interface.

Figure 2:
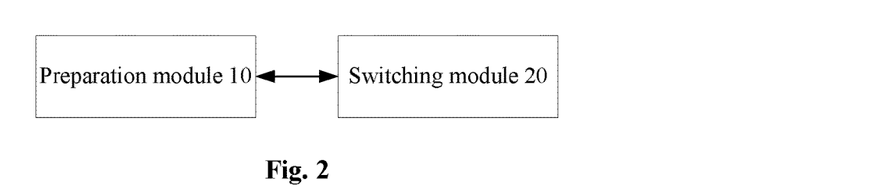
FIG. 2 is a module diagram of a BDR according to a first embodiment of the present disclosure.

Correspondingly, a BDR of the embodiment, as shown in FIG. 2, may include a preparation module 10 and a switching module 20.

The preparation module 10 may be configured to, when a user joins a subnetwork, complete a preparation for forwarding multicast traffic for the user but not forward the multicast traffic through an interface.

The switching module 20 may be configured to, when detecting that a DR in the subnetwork fails, switch the BDR to be the DR in the subnetwork, and forward the multicast traffic for the user through the interface.

In an exemplary embodiment, the preparation module may be configured to complete the preparation for forwarding the multicast traffic for the user in a following manner. The multicast traffic may be introduced, and a forwarding route to the user may be established. Specifically, the preparation for forwarding the multicast traffic for the user may be completed according to the same DR behavior specified by the protocol.

Second Embodiment

Figure 3:
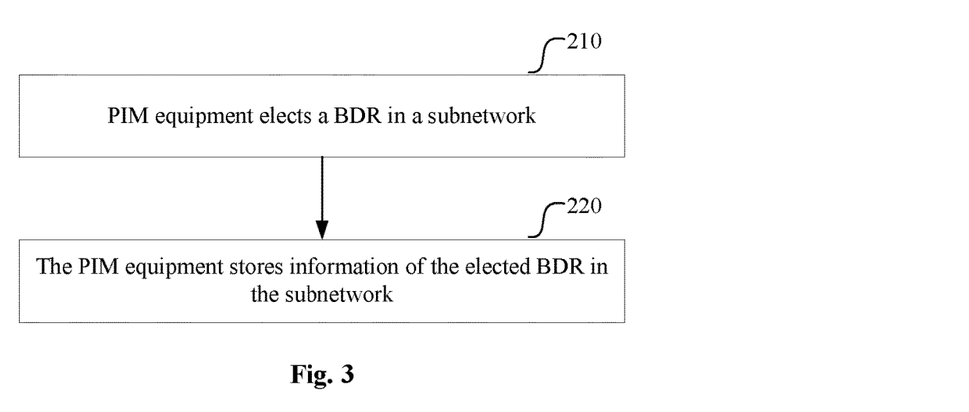
FIG. 3 is a flowchart of a BDR election method according to a second embodiment of the present disclosure.

The failure recovery method of the first embodiment provides a solution to rapid recovery of traffic during a failure of DR equipment. The embodiment discloses a method for electing a BDR in a subnetwork, which may be configured to select the BDR in the subnetwork in the first embodiment. As shown in FIG. 3, the method may include acts S210 to S220.

At act 210, PIM equipment may elect a BDR in a subnetwork.

In an exemplary embodiment, before this act, the method may further include the following acts. The PIM equipment may determine, in an election waiting state, whether a Hello message carrying information of the BDR is received or not.

In a case where the Hello message carrying the information of the BDR is not received, the operation that the PIM equipment elects the BDR in the subnetwork may include the following acts. The PIM equipment may elect the BDR in the subnetwork according to a predetermined rule.

The predetermined rule may be specified in a corresponding protocol/standard. In the embodiment, the operation that the PIM equipment elects the BDR in the subnetwork according to the predetermined rule may include the following acts. The PIM equipment may elect optimal PIM equipment among all PIM equipment, except a DR, in the subnetwork as the BDR in the subnetwork (the BDR may be elected at the same time when or after the DR is elected).

According to a specification in a standard, e.g., RFC4601, equipment in a subnetwork may keep a PIM interface and all neighbors of the interface alive, and all sent Hello messages may carry a DR priority option. At this moment, the optimal PIM equipment may refer to one piece of PIM equipment with a highest priority or one piece of PIM equipment with a largest or smallest IP address in multiple pieces of PIM equipment with a highest priority. If at least one of Hello messages received by an interface of the PIM equipment and Hello messages sent by an interface of the PIM equipment does not carry a DR priority option, one piece of PIM equipment with a largest or smallest IP address may be determined as the optimal PIM equipment.

It may be appreciated that the embodiment of the present disclosure is not limited to this specific rule. Any rule that selects one piece of PIM equipment from the multiple pieces of PIM equipment included in the subnetwork may be applied to BDR election.

Unless noted otherwise, all interfaces mentioned in the embodiments of the present disclosure may refer to an interface, which is UP in the subnetwork, of the PIM equipment.

At act 220, the PIM equipment may store information of the elected BDR in the subnetwork.

The BDR in the subnetwork may complete a preparation for forwarding multicast traffic for a user but not forward the multicast traffic through the interface when a DR in the subnetwork is normal. When the DR in the subnetwork fails, the BDR in the subnetwork may immediately forward the multicast traffic for the user, and may be switched to be a DR in the subnetwork.

When PIM equipment joins in the subnetwork, the BDR elected according to the predetermined rule may change to cause BDR switching, and such switching may increase a network burden and bring negative influence to performance of the network. Therefore, in the embodiment, the PIM equipment newly joining the subnetwork may learn about a BDR through information of the BDR carried in a Hello message sent by other PIM equipment. That is, in a case where a Hello message is received through an interface and the Hello message carries information of a BDR, PIM equipment may determine, in an election waiting state (that is, no BDR has not yet been elected), the BDR carried in the Hello message as a BDR elected by the PIM equipment. An optional implementation manner is described below. After the interface of the PIM equipment is UP in the subnetwork, the PIM equipment may enter the election waiting state and start an election waiting timer. In a case where the PIM equipment receives, in the election waiting state, a Hello message through the interface and the Hello message carries information of a BDR, the PIM equipment may enter an election state, stop the election waiting timer and determine the BDR carried in the Hello message as the BDR elected by the PIM equipment.

A timing duration of the election waiting timer may be, for example, a default keep-alive time of a neighbor (see descriptions in Chapter Default_Hello_Holdtime of the standard RFC4601 4.11 for details), and may be 105S by default. However, there are no limits made in the present disclosure, and the timing duration of the election waiting timer may be longer than the default keep-alive time or shorter than the default keep-alive time.

If the PIM equipment does not receive any Hello message including information of a BDR within the timing duration of the election waiting timer, for example, when the PIM equipment is first started PIM equipment in the subnetwork, after timeout of the election waiting timer, the PIM equipment may enter the election state, and elect the BDR in the subnetwork according to a predetermined rule.

The information of the BDR may include a legal unicast address (i.e. a unicast IP address) of the BDR. The information of the BDR may be carried through a BDR address option added in the Hello message. If a received Hello message includes a BDR address option and a value of the BDR address option is a legal unicast address, it may be considered that the received Hello carries information of a BDR. If the PIM equipment has not yet elected the BDR in the election waiting state (that is, after the PIM equipment enters an election state), a Hello message carrying a BDR address option with a value being set to a predetermined invalid value, for example, a null value or 0, may be sent through the interface.

If the PIM equipment receives a Hello message carrying a BDR address option through the interface and a value of the BDR address option is a predetermined invalid value, it may be determined that a neighbor interface is in the election waiting state. Under such a condition, a Hello message carrying a BDR address option may be sent through the interface, a value of the BDR address option being the stored legal unicast address of the BDR in the subnetwork.

Figure 5:
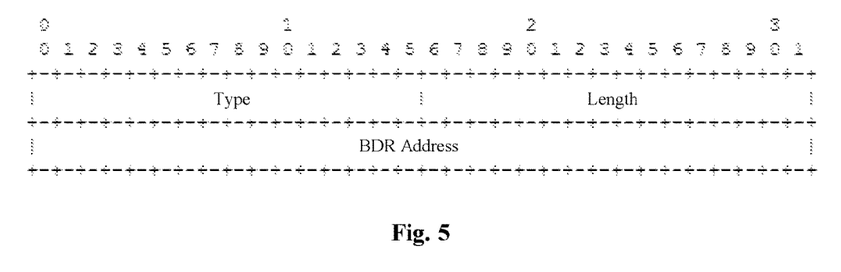
FIG. 5 is a structure diagram of a BDR address option of a Hello message according to an application example of the present disclosure.

In order to correctly decode the BDR address option, type and length fields may be added in front of the BDR address option. An exemplary BDR option of a Hello message is shown in FIG. 5, and may include:

a Type: the specific type is not limited in the embodiment of the present disclosure, and may be any one (36-65535) in Hello message option types, which are not defined at present;

a Length: the Length may be a variable length; and a BDR Address: the BDR Address may adopt a unicast address encoding format (Encoded-Unicast format) specified by the standard RFC4601 4.9.1.

Unicast address encoding format field may include: an address family (Addr Family), an Encoding Type and a Unicast Address. Detailed explanations about the unicast address encoding format field may refer to the standard RFC4601 4.9.1. In addition, a value of the BDR address being 0 means that the Addr Family field is filled with a legal Addr Family, the Encoding Type field may be any value and the Unicast Address field is filled with 0.

If PIM equipment, except the BDR, in the subnetwork defects that the DR in the subnetwork fails, at this moment, the elected BDR in the subnetwork may be elected to be a DR in the subnetwork, and the BDR in the subnetwork may be reelected according to a predetermined rule.

After the PIM equipment detects that the BDR in the subnetwork fails (for example, the PIM equipment serving as the BDR fails or a related link fails), in a case where the stored information of the BDR in the subnetwork is information of the failing BDR, the BDR in the subnetwork may be reelected, and the stored information of the BDR in the subnetwork may be updated. If a new BDR is learnt, election may not be required.

In the embodiment, the method may further include the following acts. After the information of the BDR in the subnetwork is stored or the stored information of the BDR in the subnetwork is updated, the PIM equipment may send a Hello message through the interface, the Hello message carrying the stored information of the BDR in the subnetwork. Under a reelection or another condition, in a case where the PIM equipment receives a Hello message through the interface and information of a BDR carried in the Hello message is different from the stored (locally stored) information of the BDR in the subnetwork, the following manner may be adopted for processing.

In a case where the PIM equipment is not the BDR in the subnetwork (referring to the stored BDR in the subnetwork), the BDR carried in the Hello message may be determined as a reelected BDR in the subnetwork, and the stored information of the BDR in the subnetwork may be updated.

In a case where the PIM equipment is the BDR in the subnetwork, the BDR in the subnetwork may be reelected according to a predetermined rule, and the stored information of the BDR in the subnetwork may be updated.

Another embodiment of the present disclosure discloses a computer-readable storage medium, which may store a computer-executable instruction, the computer-executable instruction being configured to execute any abovementioned method.

Figure 4:
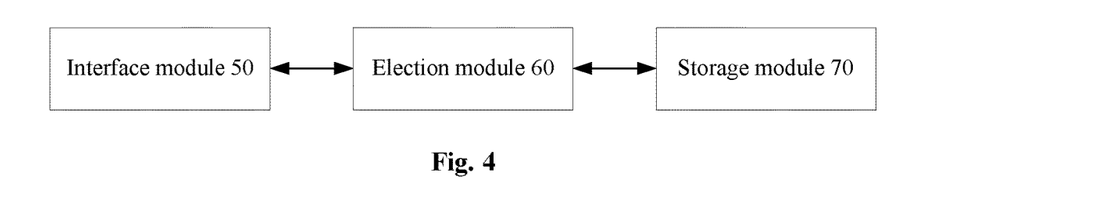
FIG. 4 is a module diagram of PIM equipment according to a second embodiment of the present disclosure.

Correspondingly, PIM equipment provided by the embodiment, as shown in FIG. 4, may include an election module 60 and a storage module 70.

The election module 60 may be configured to elect a BDR in a subnetwork.

The storage module 70 may be configured to store information of the BDR in the subnetwork.

In an exemplary embodiment, the election module may be configured to elect optimal PIM equipment among all PIM equipment, except a DR, in the subnetwork as the BDR in the subnetwork.

In an exemplary embodiment, the PIM equipment may further include an interface module 50.

The interface module 50 may be configured to receive Hello messages and send Hello messages.

All of Hello messages received by the interface module and Hello messages sent by the interface module may carry a DR priority option. The election module may be configured to elect the following PIM equipment as the BDR in the subnetwork: one piece of PIM equipment with a highest priority or one piece of PIM equipment with a largest or smallest IP address in multiple pieces of PIM equipment with a highest priority.

Alternatively, at least one of Hello messages received by the interface module and Hello messages sent by the interface module does not carry a DR priority option. The election module may be configured to elect the following PIM equipment as the BDR in the subnetwork: one piece of optimal PIM equipment with a largest or smallest IP address in the PIM equipment, except the DR, in the subnetwork.

In an exemplary embodiment, the election module may be further configured as follows.

In a case where the interface module receives, in an election waiting state, a Hello message and the Hello message carries information of a BDR, the election module may be configured to determine the BDR carried in the Hello message as the BDR elected by the election module.

In an exemplary embodiment, the election module may be configured to:

after the interface module is UP in the subnetwork, enter the election waiting state, and start an election waiting timer, a timing duration of the election waiting timer being longer than or equal to a default keep-alive time of a neighbor; and in a case where the interface module receives, in an election waiting state, a Hello message and the Hello message carries information of a BDR, enter an election state, stop the election waiting timer and determine the BDR carried in the Hello message as the BDR elected by the election module.

In an exemplary embodiment, the election module may be further configured to:

after timeout of the election waiting timer, enter the election state, and elect the BDR in the subnetwork according to a predetermined rule.

In an exemplary embodiment, the election module may be configured to elect the BDR in the subnetwork according to the predetermined rule in a following manner.

In a case where the Hello message carrying the information of the BDR is not received in the election waiting state, the election module may be configured to elect the BDR in the subnetwork according to a predetermined rule.

In an exemplary embodiment, the information of the BDR may include a legal unicast address of the BDR.

The election module may be configured to judge that the Hello message received by the interface module carries the information of the BDR in a following condition. The received Hello message includes a BDR address option and a value of the BDR address option is the legal unicast address.

In an exemplary embodiment, the interface module may be configured to implement sending of the Hello message in a following manner. In a case where the BDR has not yet been elected in the election waiting state, a Hello message carrying a BDR address option may be sent, a value of the BDR address option being a predetermined invalid value.

In an exemplary embodiment, the interface module may be further configured to, after entering an election state, in a case where a Hello message carrying a BDR address option is received and a value of the BDR address option is a predetermined invalid value, send a Hello message carrying a BDR address option through the interface, a value of the BDR address option being the stored legal unicast address of the BDR in the subnetwork.

In an exemplary embodiment, the PIM equipment may further include a detection module. The detection module may be configured to detect that the BDR in the subnetwork fails.

The election module may be further configured to: after entering an election state, in a case where the detection module detects that the BDR in the subnetwork fails and the stored information of the BDR in the subnetwork is information of the failing BDR, reelect the BDR in the subnetwork, and notify the storage module to update the stored information of the BDR in the subnetwork.

In an exemplary embodiment, the election module may be further configured to: after entering an election state, in a case where the interface module receives a Hello message and information of a BDR carried in the Hello message is different from the stored information of the BDR in the subnetwork, when the PIM equipment is not the BDR in the subnetwork, determine the BDR carried in the Hello message as a reelected BDR in the subnetwork, and update the information, stored by the storage module, of the BDR in the subnetwork; and when the PIM equipment is the BDR in the subnetwork, reelect the BDR in the subnetwork according to a predetermined rule, and update the information, stored by the storage module, of the BDR in the subnetwork.

In an exemplary embodiment, the BDR in the subnetwork may be configured to complete a preparation for forwarding multicast traffic for a user but not forward the multicast traffic through an interface when a DR in the subnetwork is normal; and when the DR in the subnetwork fails, immediately forward the multicast traffic for the user, and be switched to be a DR in the subnetwork.

In an exemplary embodiment, the election module may be further configured to: when detecting that the DR in the subnetwork fails and the local PIM equipment is not the BDR in the subnetwork, elect the elected BDR in the subnetwork to be a DR in the subnetwork, and reelect the BDR in the subnetwork according to a predetermined rule.

In an exemplary embodiment, the interface module may be further configured to: after the information of the BDR in the subnetwork is stored or the stored information of the BDR in the subnetwork is updated, send a Hello message, the Hello message carrying the information, stored by the storage module, of the BDR in the subnetwork.

In an exemplary embodiment, the election module may be configured to elect the BDR in the subnetwork according to the predetermined rule in a following manner. When the interface module does not support carrying a BDR address option in the Hello message and/or at least one Hello message received by the interface module does not include the BDR address option, the election module may elect the DR in the subnetwork, and at the same time, may elect the BDR in the subnetwork according to a predetermined rule.

In another embodiment, in a case where the PIM equipment does not support carrying a BDR address option in the Hello message and/or at least one Hello message received through an interface does not include the BDR address option, the DR in the subnetwork may be elected, and at the same time, the BDR in the subnetwork may be elected according to a predetermined rule. A method for electing the DR in the subnetwork may be implemented according to a specification in a protocol, and may also adopt another method. When the DR is elected according to the specification in the protocol, in a case where a Hello message sent by any PIM equipment in the subnetwork does not carry a BDR address option, the PIM equipment in the subnetwork may elect a DR and BDR in the subnetwork according to a predetermined rule immediately after discovery of a new neighbor.

Descriptions will be made below with an application example.

Figure 6:
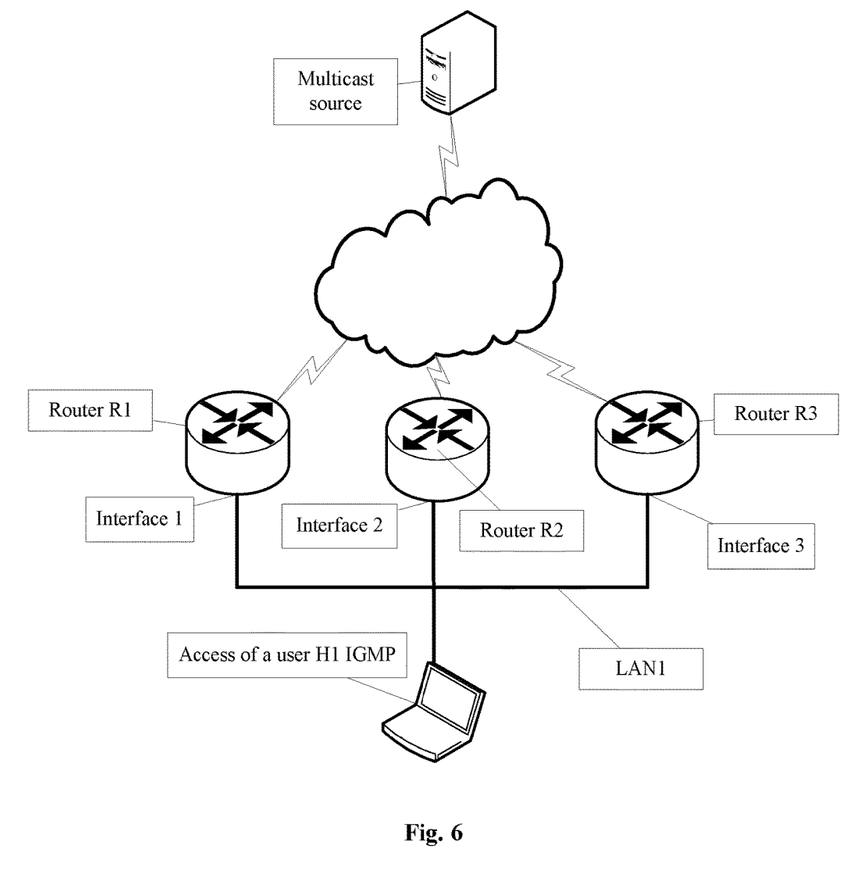
FIG. 6 is a schematic diagram of a multicast network topology according to an application example of the present disclosure.

A multicast network topology of the application example is shown in FIG. 6. In a shared subnetwork Local Area Network 1 (LAN1) where three pieces of PIM equipment R1~R3 are connected with an IGMP user 1, a time sequence is supposed to be as follows:

an interface 1 of the PIM equipment R1 is UP;
an interface 2 of the PIM equipment R2 is UP;
an election waiting timer of the PIM equipment R1 times out;
an interface 3 of the PIM equipment R3 is UP; and
the interface 1 of the PIM equipment R1 is DOWN.

DR priorities are supposed to be as follows:
the PIM equipment R3 is higher than the PIM equipment R1; and
the PIM equipment R1 is higher than the PIM equipment R2.

A processing flow of PIM equipment in the second embodiment will be described herein in an event manner at first.

Event E1: an interface is UP. Here, this event refers to that the interface of the PIM equipment is UP and there exists a legal IP address. After the event E1 is triggered, the PIM equipment may enter an election waiting state (which may also be called as a "waiting state"), and at the same time, a timer in a waiting state may be started.

Event E2: the interface receives a Hello message carrying a BDR address option of which a BDR address is 0. After the event E2 is triggered, an original state (the election waiting state or an election state) may be kept. If the interface is in the election state, a stored BDR address may be sent out through a Hello message.

Event E3: the interface receives a Hello message carrying a BDR address option of which a BDR address is a legal unicast address. In the election waiting state, after the event E3 is triggered, the election state may be entered, the BDR carried in the received Hello message may be determined as an elected BDR, and the BDR address carried in the Hello message may be stored. In the election state, after the event E3 is triggered, in a case where the PIM equipment is not a BDR, the BDR carried in the received Hello message may be determined as a reelected BDR, and the stored BDR address may be updated into the BDR address carried in the received Hello message. If the PIM equipment is a BDR, the BDR in the subnetwork may be reelected, and in a case where the BDR changes, the stored BDR address may also need to be updated.

Event E4: the waiting state timer of the interface times out. After the event E4 is triggered, the interface may enter the election state, and BDR election may be performed according to a predetermined rule.

Event E5: the interface is DOWN. Here, this event refers to that the IP address of the interface gets invalid or the interface is DOWN. After the event E5 is triggered, the interface may enter an initial state.

When the PIM equipment is in the waiting state, the sent Hello message may be a Hello message carrying the BDR address option of which the BDR address is 0. In the election state, the sent Hello message may be a Hello message carrying the BDR address option of which the BDR address is the legal unicast address. After the BDR address is stored or the stored BDR address is updated, a Hello message carrying the BDR address may be sent.

In addition, when the PIM equipment in the subnetwork elects a DR, a manner of carrying DR information through a Hello message to learn the DR may also be adopted. In such a manner, the PIM equipment may also start a timer for waiting for electing the DR after UP of the interface, and at this moment, the election waiting timer for waiting for electing the BDR and the election waiting timer for waiting for electing the DR may be the same timer, or may be different timers.

A processing process of the application example including acts 7.1 to 7.10 is as follows.

At act 7.1, the interface 1 of the PIM equipment R1 is UP to trigger the event E1. The PIM equipment R1 may enter an election waiting state, start a timer in a waiting state, and at the same time, send a Hello message, the Hello message carrying a BDR address option of which a BDR address is 0. At this moment, BDR election may be performed.

At act 7.2, the interface 2 of the PIM equipment R2 is UP to trigger the event E1. Actions the same as those executed when the interface 1 of the PIM equipment R1 is UP at act 7.1 may be executed.

At act 7.3, the interface 1 of the PIM equipment R1 receives a Hello message sent by the interface 2 of the PIM equipment R2, finds that an address of a BDR address option is 0 and the PIM equipment R1 is in the waiting state, triggers the event E2, normally establishes a PIM neighbor, keeps the waiting state and does not perform BDR election.

At act 7.4, the election waiting timer started by the PIM equipment R1 times out to trigger the event E4. The PIM equipment R1 may enter an election state, elect the PIM equipment R1 as a DR of the LAN1 and the PIM equipment R2 as a BDR of the LAN1, and then send a Hello message carrying the address of the PIM equipment R2.

At act 7.5, the interface 2 of the PIM equipment R2 receives a Hello message sent by the interface 1 of the PIM equipment R1 to trigger the event E3. The PIM equipment R2 may enter the BDR election state, determine a BDR carried in the received Hello message as a BDR elected by the PIM equipment R2, store the BDR address (i.e. the address of the PIM equipment), and simultaneously send a Hello message carrying the address of the PIM equipment R2.

At act 7.6, after the BDR is elected, the PIM equipment R2 serving as the BDR processes joining of the IGMP or MLD user in a DR processing manner in an RFC4601 protocol, may introduce traffic to itself, and establish a forwarding route to the user, but the interface 2 may not forward multicast traffic to the user.

At act 7.7, the interface 3 of the PIM equipment R3 is UP to trigger the event E1. Actions the same as those executed when the interface 1 of the PIM equipment is UP at act 7.1 may be executed.

At act 7.8, the interface 1 of the PIM equipment R1 and the interface 2 of the PIM equipment R2 receive a Hello message of the interface 3 of the PIM equipment R3, find that the PIM equipment R3 is a new neighbor, and may both immediately send Hello messages carrying the address of the PIM equipment R2.

At act 7.9, the interface 3 of the PIM equipment 3 receives the Hello message sent by the interface 1 of the PIM equipment R1 or the interface 2 of the PIM equipment R2 to trigger the event E3. Actions the same as those at act 7.5 may be executed. The BDR in the LAN1 is still the PIM equipment R2.

At act 7.10, the interface 1 of the PIM equipment R1 is DOWN, the interface 2 of the PIM equipment R2 rapidly senses this change by virtue of detection means such as Bi-directional Forwarding Detection (BFD). The interface 2 of the PIM equipment R2 may be immediately switched into a forwarding state to forward the multicast traffic, meanwhile, in a protocol layer, the PIM equipment R2 serving as the BDR may be switched to be a DR of the LAN1, and the interface 3 of the PIM equipment R3 may be elected as a BDR. The PIM equipment R3 may also elect the interface 2 of the PIM equipment R2 as a DR, and may be switched to be a BDR.

In another application example, network setting and acts 7.1~7.9 are all the same as the abovementioned application example, and thereafter, in a case where no DR failure but a BDR failure occurs, a flow is as follows.

At act 7.10, the interface 2 of the PIM equipment R2 is DOWN to trigger the event E5, and a Hello message with a keep-alive time of 0 may be sent according to a PIM protocol.

At act 7.11, both the interface 1 of the PIM equipment R1 and the interface 3 of the PIM equipment R3 may perform BDR election again after receiving the Hello message sent by the interface 2 of the PIM equipment R2, optimal equipment (at this moment, it is the PIM equipment R3) except the DR may be elected as a BDR, and a Hello message carrying an address of the PIM equipment R3 may be sent.

Sequence numbers of the embodiments of the present disclosure are adopted not to represent preference of the embodiments but only for description. From the descriptions about the embodiments, those skilled in the art may clearly know that the method of the embodiments may be implemented in a manner of combining software and a necessary universal hardware platform, and may also be implemented through hardware, but the former is a better implementation manner under many circumstances. Based on such an understanding, the technical solutions of the embodiments of the present disclosure substantially or parts making contributions to related technologies may be embodied in form of software product. The computer software product may be stored in a storage medium (for example, a Read-Only Memory (ROM)/Random Access Memory (RAM), a magnetic disk and an optical disk), including a plurality of instructions configured to enable a piece of terminal equipment (which may be a personal computer, a server, network equipment or the like) to execute all or part of the method in each embodiment of the present disclosure.

Those skilled in the art should know that all or part of the acts in the method may be implemented by instructing related hardware (for example, a processor) through a program. The program may be stored in a computer-readable storage medium, for example, a ROM, a magnetic disk or an optical disk. In an exemplary embodiment, part or all of the acts of the embodiment may also be implemented by virtue of one or more integrated circuits. Correspondingly, each module/unit in the embodiment may be implemented in form of hardware, for example, a corresponding function is realized through an integrated circuit, and may also be implemented in form of software function module, for example, the corresponding function may be realized by executing a program/instruction stored in a memory through a processor. The present disclosure is not limited to a hardware and software combination in any specific form.

The above is only the preferred embodiment of the present disclosure and not thus intended to form the scope of patent of the present disclosure. Any equivalent structure or equivalent flow transformations made by virtue of the contents of the specification and drawings of the present disclosure or direct or indirect application thereof to other related technical fields shall fall within the scope of protection defined by the appended claims of the patent of the present disclosure.

INDUSTRIAL APPLICABILITY

Rapid recovery of multicast traffic forwarding for the user when the DR in the subnetwork fails may be implemented. Furthermore, switching of BDR equipment when new PIM equipment joins may be avoided, which may be favorable for performance of the network.

What is claimed is:

1. A Backup Designated Router (BDR) election method, the method comprising:
    electing, by Protocol Independent Multicast (PIM) equipment, a BDR in a subnetwork; and
    storing, by the PIM equipment, information of the elected BDR in the subnetwork, and sending, by the PIM equipment, a Hello message through an interface, the Hello message carrying the stored information of the BDR in the subnetwork;
    wherein, in a case where the PIM equipment receives, in an election waiting state, a Hello message through an interface and the Hello message carries information of a BDR, electing, by the PIM equipment, the BDR in the subnetwork comprises: determining, by the PIM equipment, the BDR carried in the received Hello message as the BDR elected by the PIM equipment.

2. The method as claimed in claim 1, wherein before electing, by the PIM equipment, the BDR in the subnetwork, the method further comprises: determining, in an election waiting state by the PIM equipment, whether a Hello message carrying information of a BDR is received or not, wherein
    in a case where the Hello message carrying the information of the BDR is not received, electing, by the PIM equipment, the BDR in the subnetwork comprises: electing, by the PIM equipment, the BDR in the subnetwork according to a predetermined rule.

3. The method as claimed in claim 2, wherein electing, by the PIM equipment, the BDR in the subnetwork according to the predetermined rule comprises:
    electing, by the PIM equipment, optimal PIM equipment among all PIM equipment, except a Designated Router (DR), in the subnetwork as the BDR in the subnetwork.

4. The method as claimed in claim 2, in a case where the PIM equipment has not yet elected the BDR in the election waiting state, further comprising:
    sending a Hello message carrying a BDR address option through an interface, a value of the BDR address option being a predetermined invalid value.

5. The method as claimed in claim 4, after the PIM equipment enters an election state, further comprising:
    in a case where the PIM equipment receives a Hello message carrying a BDR address option through the interface and a value of the BDR address option is a predetermined invalid value, sending a Hello message carrying a BDR address option through the interface, a value of the BDR address option being a stored legal unicast address of the BDR in the subnetwork.

6. The method as claimed in claim 2, wherein
electing, by the PIM equipment, the BDR in the subnetwork according to the predetermined rule comprises:
when the PIM equipment does not support carrying a BDR address option in the Hello message and/or at least one Hello message received through an interface does not comprise the BDR address option, electing a DR in the subnetwork, and at the same time, electing the BDR in the subnetwork according to the predetermined rule.

7. The method as claimed in claim 3, wherein
all of Hello messages received by an interface of the PIM equipment and Hello messages sent by an interface of the PIM equipment carry a DR priority option; the optimal PIM equipment refers to one piece of PIM equipment with a highest priority or one piece of PIM equipment with a largest or smallest Internet Protocol (IP) address in multiple pieces of PIM equipment with a highest priority; or
at least one of Hello messages received by an interface of the PIM equipment and Hello messages sent by an interface of the PIM equipment does not carry a DR priority option; and the optimal PIM equipment refers to one piece of PIM equipment with a largest or smallest IP address.

8. The method as claimed in claim 1, wherein
after the interface of the PIM equipment is UP in the subnetwork, the PIM equipment enters the election waiting state and starts an election waiting timer; and
in a case where the PIM equipment receives, in the election waiting state, the Hello message through the interface and the Hello message carries information of a BDR, the PIM equipment enters an election state, stops the election waiting timer and determines the BDR carried in the Hello message as the BDR elected by the PIM equipment.

9. The method as claimed in claim 8, further comprising:
after timeout of the election waiting timer, entering, by the PIM equipment, the election state, and electing, by the PIM equipment, the BDR in the subnetwork according to a predetermined rule.

10. The method as claimed in claim 8, wherein a timing duration of the election waiting timer is longer than or equal to a default keep-alive time of a neighbor.

11. The method as claimed in claim 1, wherein
the information of the BDR comprises a legal unicast address of the BDR; and
that the received Hello message carries the information of the BDR comprises that: the received Hello message comprises a BDR address option and a value of the BDR address option is the legal unicast address.

12. The method as claimed in claim 1, further comprising:
after the PIM equipment detects that the BDR in the subnetwork fails, in a case where the stored information of the BDR in the subnetwork is information of the failing BDR, reelecting the BDR in the subnetwork, and updating the stored information of the BDR in the subnetwork.

13. The method as claimed in claim 1, further comprising:
after the PIM equipment enters an election state, when the PIM equipment receives a Hello message through an interface and information of a BDR carried in the Hello message is different from the stored information of the BDR in the subnetwork,
in a case where the PIM equipment is not the BDR in the subnetwork, determining the BDR carried in the Hello message as a reelected BDR in the subnetwork, and updating the stored information of the BDR in the subnetwork; and
in a case where the PIM equipment is the BDR in the subnetwork, reelecting the BDR in the subnetwork according to a predetermined rule, and updating the stored information of the BDR in the subnetwork.

14. The method as claimed in claim 1, further comprising:
when a DR in the subnetwork is normal, completing a preparation for forwarding multicast traffic for a user, but not forwarding the multicast traffic through an interface by the BDR in the subnetwork; and when the DR in the subnetwork fails, forwarding the multicast traffic for the user, and switching the BDR itself to be a DR in the subnetwork by the BDR in the subnetwork.

15. The method as claimed in claim 1, further comprising:
after the PIM equipment updates the stored information of the BDR in the subnetwork, sending the Hello message through an interface, the Hello message carrying the stored information of the BDR in the subnetwork.

16. The method as claimed in claim 1, further comprising:
after the PIM equipment enters an election state, when PIM equipment, except the BDR, in the subnetwork detects that a DR in the subnetwork fails, electing the elected BDR in the subnetwork to be a DR in the subnetwork, and reelecting the BDR in the subnetwork according to a predetermined rule.

17. A Designated Router (DR) failure processing method, comprising:
when a user joins, completing a preparation for forwarding multicast traffic for the user but not forwarding the multicast traffic through an interface by a Backup Designated Router (BDR) in a subnetwork; and
when detecting that a DR in the subnetwork fails, automatically switching the BDR to be a DR in the subnetwork, and forwarding, by the BDR, the multicast traffic for the user through the interface.

18. The method as claimed in claim 17, wherein
completing, by the BDR, the preparation for forwarding the multicast traffic for the user comprises: introducing the multicast traffic, and establishing a forwarding route to the user.

19. Protocol Independent Multicast (PIM) equipment comprising:
an election module, configured to elect a Backup Designated Router (BDR) in a subnetwork; and
a storage module, configured to store information of the BDR in the subnetwork;
the PIM equipment being further configured to, after the information of the BDR in the subnetwork is stored, send a Hello message, the Hello message carrying the information, stored by the storage module, of the BDR in the subnetwork;
wherein the election module is further configured to: in a case where the interface module receives, in an election waiting state, a Hello message and the Hello message carries information of a BDR, determine the BDR carried in the received Hello message as the BDR elected by the election module.

* * * * *